Oct. 3, 1972 TAKASHI WAKABAYASHI ET AL 3,695,870

PROCESS OF PRODUCING A LATENT IMAGE

Filed Nov. 17, 1970 2 Sheets-Sheet 1

INVENTORS
TAKASHI WAKABAYASHI
SHIRO HOZUMI
KANJI SUGIHARA

BY Wenderoth, Lind & Ponack
ATTORNEYS

Oct. 3, 1972 TAKASHI WAKABAYASHI ET AL 3,695,870

PROCESS OF PRODUCING A LATENT IMAGE

Filed Nov. 17, 1970 2 Sheets-Sheet 2

INVENTORS
TAKASHI WAKABAYASHI
SHIRO HOZUMI
KANJI SUGIHARA

BY Wenderoth, Lind & Ponack
ATTORNEYS

United States Patent Office 3,695,870

Patented Oct. 3, 1972

3,695,870

PROCESS OF PRODUCING A LATENT IMAGE

Takashi Wakabayashi, Ibaragi, Shiro Hozumi, Sakai, and Kanji Sugihara, Hirakata, Japan, assignors to Matsushita Electric Industrial Co., Ltd., Osaka, Japan Filed Nov. 17, 1970, Ser. No. 90,331
Claims priority, application Japan, Dec. 2, 1969, 44/97,417, 44/97,418
Int. Cl. G03g 13/22
U.S. Cl. 96—1 E 7 Claims

ABSTRACT OF THE DISCLOSURE

A process of producing a latent image. An electric field is applied in the shape of the desired image to an insulating memory plate comprising resin having finely divided conductive particles dispersed therein whereby the electric field-struck area has the electrical resistivity thereof changed from a high electrical resistance to a low electrical resistance. An electric current is supplied to said electric field-struck area whereby said low electrical resistance is preserved permanently as a memorized image.

This invention relates to a latent image producing process using a memory plate having finely divided conductive particles dispersed in resin, to which is applied an electric field and an electric current.

There have been known various processes to produce a latent image. These processes are usually based on photo-reactions and must be carried out preferably in the dark. The latent image produced by an electrostatic process is apt to fade out with time.

It is desirable to produce a latent image in light without using any photo-reactions. It is also desirable to produce a latent image which does not fade out with time and which makes it possible to copy it repeatedly. The prior literature usually describes a latent image produced by an electro-photographic process but has not paid attention to a latent image produced by an application of an electric field and electric current in the light without using a photo-reaction.

An object of the present invention is to provide a process for producing a latent image, without using a photo-reaction, on a memory plate which has finely divided conductive particles dispersed in resin.

A further object of the present invention is to provide a process for producing a latent image in desired pattern on a memory plate which has finely divided conductive particles dispersed in resin, said latent image being characterized by a high resistance to fade-out during repeated copying.

The objects are achieved by providing a latent image producing process which comprises applying an electric field in the shape of a desired image to an insulating memory plate comprising resin having finely divided conductive particles dispersed therein whereby the electric field-struck area has the electrical resistivity changed from a high electrical resistance to a low electrical resistance, and supplying an electric current to said electric field-struck area whereby said low electrical resistance is preserved permanently as a memorized image.

These and other features of the present invention will be apparent from the following detailed description taken together with the accompanying drawings, wherein.

Figure 1:
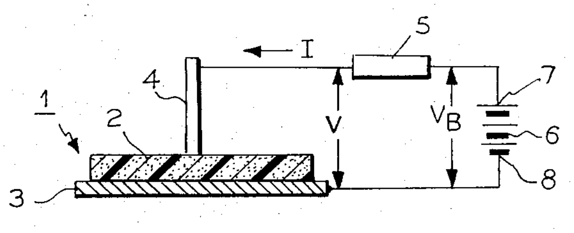
FIG. 1 is a cross sectional view of an embodiment of a memory plate and a conductive pen according to the present invention.

Referring to FIG. 1, a memory plate 1 comprises a memory film 2 and an electrode 3 attached to said memory film 2. Said memory film 2 comprises a resin having finely divided conductive particles dispersed therein. Said electrode 3 is connected to one side 8 of a battery 6. A conductive pen 4 is designed to move in contact with said memory film 2, and is connected, through an electric resistor 5, to the other side 7 of said battery 6. An electric field in the shape of a desired pattern can be supplied to said memory film 2 by drawing the desired pattern on said memory film 2 with said conductive pen 4.

Figure 2:
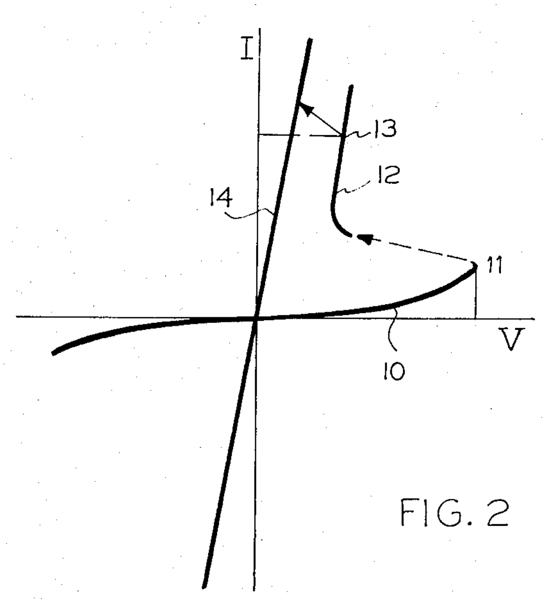
FIG. 2 is a graph illustrating exemplary voltage-current characteristics of a memory film according to the present invention.

The memory film 2 according to the present invention has three electric conduction states due to the resistivity thereof; a low conduction high resistance state, a high conduction low resistance state and a new voltage-current characteristic state, which are dependent upon the voltage applied across the conductive pen 4 and the electrode 3, as shown in FIG. 2. When the voltage V (FIG. 1) applied across the memory film 2 which is in the low conduction high resistance state 10 is increased up to a first threshold value 11, the conduction state of said memory film 2 is transformed quickly from the low conduction high resistance state 10 to the high conduction low resistance state 12. After the transformation into the high conduction low resistance state 12, an increase in the voltage V causes a high current I (FIG. 1) to flow almost linearly from said conductive pen 4 to said electrode 3. An increase in the current I up to a second threshold value 13 causes said memory film 2 to transform quickly from the high-conduction low resistance state 12 to the new voltage-current characteristic state 14. In the new voltage-current characteristic state, a decrease in the voltage V results in an almost linear decrease in the current 1 down to zero. This new voltage-current characteristic state is referred to hereinafter as a memory state. The voltage-current characteristic in the memory state is maintained even during repeated cycles of increasing and decreasing voltage and can be maintained for a long period in the absence of an applied voltage. The memory state can be transformed into the high resistance state by heating said memory film 2 at a temperature above the glass transition temperature of the resin included in said memory film 2. The glass transition temperature of the resin can be determined by the methods of dilatometry and thermo-analysis.

By applying an electric field in a desired pattern to the memory film 2 in a manner mentioned above, one can cause the desired pattern to be memorized in the memory state. The portion of the film which has been changed to the memory state cannot be distinguished from the remainder of the film and thus constitutes a latent image formed by the portion of the memory film 2 which has a low electrical resistivity, i.e. a memorized path traced by the pen 4.

The transition from the high resistance state 10 through the low resistance state 12 to the memory state 14 can be continuously achieved in one step when the voltage across the electrode 3 and the conductive pen 4 is higher than the first threshold value 11. This can be effected by adjusting the voltage $V_B$ (FIG. 1) of the battery 6 and the resistance value of the electric resistor 5. The transition time necessary for said transition is dependent upon said voltage $V_B$ and the composition of the memory film 2 and ranges practically from 1 millisecond to 0.1 microsecond. Such a short transition time makes it possible for the conductive pen 4 to move quickly on the memory film 2.

The latent image so produced on said memory film 2 can be developed by any suitable and available development process. Various development processes are known. In U.S. Pat. No. 3,526,502 patented Sept. 1, 1970, by Y. Murakami and K. Morimoto and assigned to the assignee of the present invention, the following development process is outlined. When the memory plate 1 having a latent image in the memory film 2 thereof is adapted to have positive or negative electrostatic charge deposited thereon, the electrostatic charge deposited on said latent image leaks to the electrode 3. Then, said memory plate 1 is powdered over with a developer in a per se known manner. This developer consists of toner and carrier. The toner consists of a low melting-point polystyrene, colophony and carbon black. The toner is mixed with a carrier substance having a property that the toner becomes triboelectrically charged with a charge of the same sign as that deposited on said memory plate 1. A visible positive image is produced on said memory plate 1, and is fixed by slight heating of the memory film 2.

When said memory plate having a visible image of the developer on the surface thereof is pressed on a paper before the fixing process, the visible image can be transferred from said memory plate 1 to said paper and is fixed by slight heating. Said memory plate having the latent image on the surface thereof can be essentially permanently used as a master in such an electrostatic printing process. Said latent image is erased from the memory film 2 by heating said memory film 2 up to the glass transition temperature of the resin included in said memory film 2. Said memory film 2 can be used for numerous cycles of memorizing and erasing of a latent image.

Figure 3:
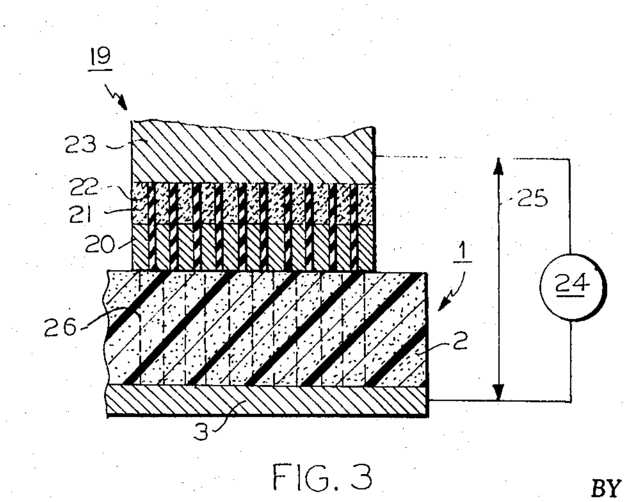
FIG. 3 is a cross sectional view of an embodiment of a memory plate and a multi-dot electrode according to the present invention.

Referring to FIG. 3, a multi-dot electrode 19 comprises a plurality of dot electrodes 20 each associated with a small electric resistor 21. Each of the dot electrodes 20 is conductively connected through said small electric resistor 21 to a metal electrode 23. Dot electrodes 20 as well as small resistors 21 are insulated from each other by insulating layers 22. The metal electrode 23 is conductively connected with an electric power source 24 which provides an adjusted voltage 25. The electrode 3 of the memory plate 1 is connected conductively with the electric power source 24. When said multidot electrode 19 is pressed down against the memory plate 1, the dot electrodes 20 supply electric voltage and current independently of each other to the memory film 2 at the contact areas. The conduction state of said memory film 2 is transformed, at the contact areas, from the low conduction high resistance state, passing to the memory state through the high conduction low resistance state. Therefore, conductive paths 26 are formed at the contact areas, i.e. electric field-struck areas which have the same shape as that of the bottom face of said multi-dot electrode 19. In such a way, said electric field struck areas can produce a latent image similar to the shape of the bottom face of said multi-dot electrode 19. The latent image can be made visible by the development process. When a plurality of the dot electrodes 20 are arranged in a desired pattern, the pattern on the memory plate 1 is memorized as a latent image.

It is difficult from a practical standpoint to obtain a memory film 2 having a uniform distribution of the transition times. When a metal electrode having a desired shape is pressed down against the memory film 2 having irregular distribution of said transition times, the memory paths are not formed uniformly.

Figure 4:
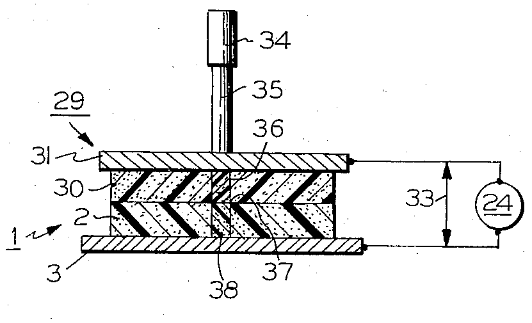
FIG. 4 is a cross sectional view of an embodiment of a memory plate according to the present invention, which has a composite electrode associated therewith.

Referring to FIG. 4, the memory plate 1 has associated therewith a composite electrode 29 comprising a photoconductive layer 30 and a transparent electrode 31. Said photoconductive layer 30 is conductively adhered to the surface of the memory film 2. Said transparent electrode 31 is conductively attached to said photoconductive layer 30. An electric power source 24 is conductively connected with said transparent electrode 31 and the electrode 3 so that an electric voltage 33 is applied across said photoconductive layer 30 and the memory film 2. A tungsten lamp 34 having a conventional condensing lens system is designed to project a light beam 35 on said photoconductive layer 30 through said transparent electrode 31.

When said memory plate 1 is supplied with an electric voltage across the electrode 3 and the transparent electrode 31 is subjected to a light beam 35 through said photoconductive layer 30, said photoconductive layer 30 forms, at the light-struck area, a conductive path 36 having a low electrical resistivity. The memory film 2 passes a high electric voltage only at the area 37 corresponding to the light-struck area. In such a way, the memory film 2 can form a memory path 38 having a pattern similar to the path of movement of the light beam. The electric voltage at the area 37 must be higher than the first threshold value 11 of FIG. 2 and can be determined by a ratio of the electric resistance of said conductive path 36 to that of the memory path 38 in the memory film 2. Said memory path 38 can be formed in one step by adjusting the light intensity of the tungsten lamp 34 and the value of the voltage 33 of the electric power source 24 so that the voltage across the memory film 2 is higher than the first threshold value 11. When said light beam 35 moves on said photoconductive layer 30 so as to trace any desired pattern of an image by any available means, said photoconductive layer 30 has the conductive path 36 formed therein in the desired pattern. Therefore, successive conductive paths 36 in said memory film 2 form a memory path 38 in the desired pattern in accordance with the present invention. The desired pattern of the image can be retained in said memory film 2 as a latent image. Such a latent image can be made visible by the development process mentioned hereinbefore.

Various photoconductive materials and transparent electrodes are known in the art. A suitable and available photoconductive layer 30 and transparent electrode 31 are those described in U.S. Pat. No. 3,526,502 patented Sept. 1, 1970, by Y. Murakami and K. Morimoto and assigned to the assignee of the present invention. According to said patent, the photoconductive layer 30 is made of a photoconductive polymeric compound having a sensitizer incorporated therein and the transparent electrode 31 is a glass plate having a NESA coating, an electrically conductive glass coating, on the inner surface thereof.

Figure 5:
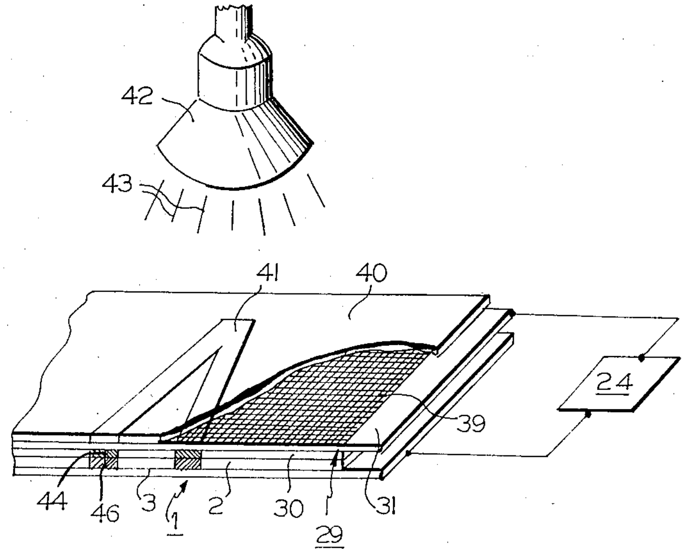
FIG. 5 is a perspective view of an embodiment of a memory plate according to the present invention, which has a composite electrode having a mesh covering the surface thereof.

A light image can be more preferably reproduced on a memory plate 1 having a composite electrode 29 provided with a fine mesh integrated therewith as shown in FIG. 5. With reference to FIG. 5 in which similar numerals designate components similar to those of foregoing figures, a photographic master 40 having a negative image 41 is laid upon said composite electrode 29. Said composite electrode 29 is composed of a photoconductive layer 30 and a transparent electrode 31 which has a fine mesh 39 thereon. Said mesh 39 is made of an opaque material. A tungsten lamp 42 irradiates said photoconductive layer 30 through said photographic master 40 and said transparent electrode 31 provided with said mesh 39. The electric power source 24 is connected with said transparent electrode 31 and the electrode 3 so that an electric voltage can be applied across said photoconductive layer 30 and the memory film 2.

Upon a lighting of said tungsten lamp 42, light 43 from said tungsten lamp 42 irradiates said transparent electrode 31 through said image 41 and is divided into a plurality of small light beams by said mesh 39. Each of the small light beams produces a small conductive path 44 in the photoconductive layer 30. The memory film 2 is provided with a high electric voltage only at the portions corresponding to the conductive paths 44 and forms memory paths 46. Therefore, a latent image of the image 41 of the photographic master 40 is reproduced on said memory film 2 as an aggregation of the plurality of memory paths 46. The latent image can be made visible by the development process mentioned hereinbefore. A latent image of a superior quality cannot be reproduced without said mesh 39 because of the difficulty in obtaining a uniform distribution of the transition times in the memory film 2.

Figure 6:
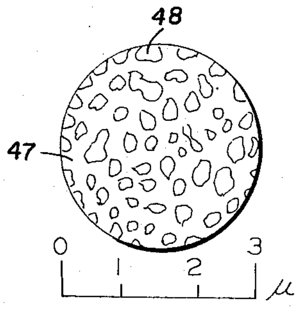
FIG. 6 is an enlarged partial cross section of a memory plate according to the present invention.

With reference to FIG. 6, a description will be given of the memory film 2 which comprises resin 47 having finely divided conductive particles 48 dispersed therein.

The resin 47 has a great effect on the transition times for transformations from the high resistance state to the low resistance sttae and from the low resistance state to the memory state. Furthermore, the resin has a great effect on the stability during repeating cycles of the memorizing processes. A faster transition time and a higher stability can be obtained when the resin 47 has chlorine or bromine atoms incorporated therein. The incorporation of chlorine or bromine atoms can be achieved by using a mixture of organic resin and a chlorine or bromine compound or a chlorine or bromine resinous compound. Exemplary preferable resins are as follows; halogen containing organic resin such as polyvinyl chloride, chlorinated natural rubber; and polystyrene, polyacetal, polyester, epoxy resin, polyamide, being admixed with a low molecular halogen compound such as chlorinated paraffine.

The finely divided conductive particles 48 preferably have an average particle size of 0.1 to 10 microns. The most preferred average particle size is 0.2 to 1 micron. The first threshold value 11 and the second threshold value 13 (FIG. 2) become unstable during repeating cycles when the particle size is less than 0.1 micron. On the contrary, when the average particle size is more than 10 microns, the resultant first threshold value 11 and second threshold value 13 (FIG. 2) deviate widely from the desired values. The average particle size is determined by the methods of sedimentation analysis and electron microscopy.

A preferred material for the finely divided conductive particles 48 is one member selected from the group consisting of silver, iron, copper, carbon black and graphite. Among those materials, silver particles give the best result.

The distance between individual conductive particles 48 dispersed in the resin 47 has a significant effect on the transformations from the high resistance state to the memory state through the low resistance state. Any conductive particle which is in contact with other particles makes no contribution to such transformations. A greater inter-particle distance on the average, produces a memory film, 2 having a higher electric resistivity and makes the first threshold value 11 larger and the distribution of the transition times wider. An electron microscopic observation indicates that a distance of 500 to 10,000 A. is operable for producing a latent image. The distance is dependent upon the average particle size of the finely divided conductive particles 48, the volume of said finely divided conductive particles relative to the volume of the resin 47, and the distribution of said finely divided conductive particles 48 in the resin 47. The percentage of the total volume of resin 48 and the percentage of the volume occupied by said finely divided conductive particles 47 are determined from the specific gravity of said finely divided conductive particles 48 and the resin 47 and the average particle size of said finely divided conductive particles 48. For example, when silver particles having an average particle size of 0.5 micron are dispersed in a resin, the percentage of the volume occupied by the silver particles is about 15% and that by the resin is about 85%.

The memory plate 1 according to the present invention can be formed by any suitable and available method. A given amount of a resin is dissolved in any suitable solvent. The amount of solvent is chosen so that the resultant solution will have a viscosity of about 10 poises. Finely divided conductive particles in the desired amount are added to the solution. The amount of finely divided conductive particles must be such as to occupy the desired percentage volume relative to the resin. The mixture is mixed well by any suitable and available method, for example a ball mill, to produce a homogeneous paint having said finely divided conductive particles dispersed uniformly in the solution. The homogeneous paint is appled to any suitable substratum acting as the electrode 3 (FIGS. 1, 3, 4 and 5) and is heated to evaporate the solvent.

Another method for providing the memory plate 1 is to heat said homogeneous paint for achieving evaporation of the solvent. The heated paint is a homogeneous mixture of said finely divided conductive particles and said resin. The homogeneous mixture is treated to form a film according to well known plastic film making technology, for example extrusion from a slit nozzle. The resultant memory film 2 is adapted to have any suitable electrode attached conductively to the surface thereof.

EXAMPLE 1

There are formed various memory films having various amounts of finely divided conductive particles dispersed in different kinds of resin. In one series of samples one weight portion of chlorinated natural rubber having 60 weight percent of chlorine incorporated therein is dissolved in 10 weight portions of ortho dichloro-benzene. Silver powder having an average particle size of 0.5 micron is dispersed uniformly in the solution to form a homogeneous paint. The weight percentage of silver powder and chlorinated natural rubber are adjusted so as to be 30% to 80% and 70% to 20%. The homogeneous paint is applied to an aluminum foil by a blade coating method and is heated at 170° C. for 1 hour. The resultant memory film has a thickness of about 0.15 mm. Electrical characteristics of the resultant memory plates are checked by the electric circuitry shown in FIG. 1.

When silver powder is present in an amount greater than 58 weight percent the film is a conventional conductive film which does not have the novel three conduction states. When silver powder is present in an amount less than 43 percent the film is an insulating film having a high electrical resistance similar to that of chlorinated natural rubber. When silver powder is present in an amount of 43 to 58 weight percent the film is a memory film having the high resistance state, the low resistance state and the memory state according to the present invention. Table 1, samples 1–4, shows the electrical characteristics of the memory plates from among the films of the samples formed as described above.

In another series of samples, silver powder having an average particle size of 0.5 micron is dispersed in several kinds of resins listed in samples 5 and 6 in Table 1. The weight percentage of both the silver and the resin is 50 percent. Several memory plates are prepared in a manner similar to that mentioned above. Electrical characteristics of the resultant memory plates are checked by the electric circuitry shown in FIG. 1. The resultant characteristics are shown in Table 1.

The NESA coating, i.e. transparent electrode 31, is connected with said electric power source 24. The voltage 33 is maintained at 65 volts in the dark. The light beam 35 having a light intensity more than 35 lux. sec. forms a memory path in the memory film 2. The lighted spot is moved so as to trace the pattern of an image. After the exposure to the light, the memory plate 1 is peeled off from the composite electrode 29 in the dark. The latent image retained in the memory film 2 is developed by the method mentioned hereinbefore, in the light.

TABLE 1

The electrical characteristics of the resultant memory plates

| No. | Resin | Weight percent of silver powder | Resistance* High resistance state (Ω) | Resistance* Low resistance state (Ω) | First threshold value (V) | Operable values of the resistor 5 and $V_B$ |
|---|---|---|---|---|---|---|
| 1 | Chlorinated natural rubber | 43 | $5\times10^{10}$ | $1\times10^{6}$ | 120 | 200 kΩ, 600 V |
| 2 | do | 50 | $1\times10^{10}$ | $5\times10^{4}$ | 20 | 30 kΩ, 70 V |
| 3 | do | 55 | $1\times10^{9}$ | $1\times10^{3}$ | 5 | 5 kΩ, 7 V |
| 4 | do | 58 | $5\times10^{7}$ | $2\times10^{3}$ | 0.02 | 100 Ω, 1.5 V |
| 5 | Chlorinated polyethylene | 50 | $5\times10^{10}$ | $2\times10^{4}$ | 25 | 10 kΩ, 60 V |
| 6 | Polystyrene of 75 wt. percent chlorinated paraffine of 25 wt. percent. | 50 | $1\times10^{10}$ | $1.5\times10^{4}$ | 18 | 10 kΩ, 40 V |

*Measured by the conductive pen 4 in a stationary state.

The memory plate having a latent image formed therein is charged with a corona discharge by means of a charging device maintained at about 6000 volts in the light. Said memory plate is powdered with a developer comprising a toner and a carrier. A positive image is produced and is fixed by slight heating of the memory film.

EXAMPLE 2

A suitable multi-dot electrode according to the present invention is prepared in the following way: 15 weight percent of finely divided graphite powder is mixed with 85 weight percent of a phenolic resin. Each particle of the graphite powder is generally in shape of small foil. Such a mixture is further mixed and kneaded to form a stiff-pasty premix by a hot roll milling. The premix is formed into a rod shape by an extruding machine. The finely divided graphite powder in the extruded rod is dispersed in a preferential orientation so that each of the small foils of the graphite particle is parallel to the extrusion axis. Said extruded rod is thus equivalent to a bundle of a plurality of filaments in the form of the graphite foils, each of which is adapted to have a desired electric resistance. Thus, a cylinder cut out of said extruded rod, having a desired length, is adapted to form one electrode element of the multi-dot electrode. Said cylinder is adapted to have a relief of a desired image formed on one end face thereof. Said cylinder has an electrode of a conductive paint applied to the other end face thereof. Said cylinder is heated at 150° C. for an hour to cure the phenolic resin.

The memory plate No. 2 of the Example 1, is connected with an alternating current electric power source 24, as shown in FIG. 3. The multi-dot electrode 19 with electrodes 20 produced as described above is connected with the electric power source 24. Said multi-dot electrode 19 is pressed down against the memory film 2 of said memory plate 1 for about 10 milliseconds. The voltage 25 of said electric power source 24 ranges suitably from 75 volts to 130 volts RMS (root mean square). The resultant latent image can be made visible by the development process mentioned hereinbefore.

EXAMPLE 3

A suitable composite electrode according to the present invention is prepared as follows: 1 gram of poly-N-vinylcarbazole and 0.004 gram of a benzopyrylium salt are dissolved in 10 milliliters of methylene chloride. The solution is applied to a NESA coating on a glass plate by a blade coating method and is dried to form a layer of about 10 microns in thickness.

The memory plate No. 2 of the Example 1, is connected with an electric power source 24 as shown in FIG. 4. The composite electrode 29 provided as mentioned above is laid over the memory film 2 of said memory plate 1 so that the photoconductive layer 30 will conductively touch the whole area of the memory film 2.

EXAMPLE 4

A composite electrode having a mesh is prepared as follows: a plurality of fine lines at right angles to each other are deposited on a NESA coating on a glass plate by evaporation of aluminum in a vacuum. A photoconductive layer similar to that shown in Example 3, is applied to said NESA coating having the mesh integrated therewith. The memory plate No. 2 of the Example 1 is connected with an electric power source 24 as shown in FIG. 5. The composite electrode 29 prepared as described above is laid over the memory film 2 of said memory plate 1 so that the photoconductive layer 30 will conductively touch the whole area of the memory film 2. The NESA coating, i.e. transparent electrode 31, of the composite electrode is connected with said electric power source 24. The voltage 33 is maintained at 65 volts in the dark. A negative photographic master 41 is placed on said composite electrode 29. This arrangement is exposed to a 100 w. tungsten lamp 42 at an intensity of about 50 lux for about 1 second. After the exposure to light, the memory plate 1 is peeled off the composite electrode 29 in the dark. The latent image retained in the memory film 2 is developed to form a positive image by the method mentioned hereinbefore, in the light.

What is claimed is:

1. A latent image producing process which comprises applying an electric field of more than a first threshold value of an insulating memory plate in the shape of a desired image to said insulating memory plate, said plate comprising resin halogenated with atoms taken from the group consisting of chlorine and bromine, and said resin having therein finely divided electrically conductive particles having metallic conduction characteristics and having an average particle size of 0.1 to 10 microns and which are spaced from each other an average distance of 500 to 10,000 A., the electrical resistivity of the electric field struck area of said plate being lower than that of the remainder of said plate; and supplying an electric current of more than a second threshold value of said insulating memory plate to said electric field struck area for more than the transition time of said insulating memory plate so as to preserve permanently said lower electrical resistivity of said electric field struck area as a memorized latent image, said transition time of said insulating memory plate being 0.1 microsecond to 1.0 millisecond.

2. A latent image producing process as claimed in claim 1 wherein said electric field is applied through an electrode having the shape of the desired image.

3. A latent image producing process as claimed in claim 2 wherein said electrode is composed of a plurality of dot electrodes.

4. A latent image producing process as claimed in claim 1, wherein said electric field is applied through a movable electrode which moves freely on said insulating memory plate.

5. A latent image producing process as claimed in claim 1, wherein said electric field is applied through a composite electrode consisting essentially of a transparent conductive layer and a photoconductive layer, the step of applying said electric field including exposing said composite electrode to a light image.

6. A latent image producing process as claimed in claim 5 wherein said composite electrode has a mesh integrated therewith.

7. A latent image producing process as claimed in claim 1 wherein said finely divided conductive particles are particles of silver powder having an average particle size of 0.2 to 1 micron.

References Cited

UNITED STATES PATENTS

| | | | |
|---|---|---|---|
| 3,573,904 | 4/1971 | Clark | 96—1 R |
| 2,798,959 | 7/1957 | Moncrieff-Yeates | 96—1 E |
| 3,306,160 | 2/1967 | Dinhobel et al. | 204—18 PC |
| 3,121,006 | 2/1964 | Middleton et al. | 96—1.5 |
| 3,316,088 | 4/1967 | Schaffert | 96—1.5 |
| 3,331,062 | 7/1967 | Wisdon et al. | 340—173 CH |
| 3,556,787 | 1/1971 | Letter | 96—1 E |
| 3,573,753 | 4/1971 | Skelly et al. | 340—173 CR |
| 3,081,165 | 3/1963 | Ebert | 96—1 E |

CHARLES E. VAN HORN, Primary Examiner

U.S. Cl. X.R.

204—18 PC; 346—1; 340—173 CH, 173 LT; 117—1.7, 17.5